United States Patent [19]

Zahir et al.

[11] 4,127,615

[45] Nov. 28, 1978

[54] EPOXIDE RESIN MIXTURES

[75] Inventors: Abdul-Cader Zahir, Oberwil; Alfred Renner, Münchenstein, both of Switzerland

[73] Assignee: Ciba-Geigy Corporation, Ardsley, N.Y.

[21] Appl. No.: 803,498

[22] Filed: Jun. 6, 1977

[30] Foreign Application Priority Data

Jun. 17, 1976 [CH] Switzerland .................. 7746/76

[51] Int. Cl.$^2$ .............................................. C08L 63/00
[52] U.S. Cl. ............................ 260/837 R; 260/830 P
[58] Field of Search ..................... 260/830 P, 837 R

[56] References Cited

U.S. PATENT DOCUMENTS

| 3,429,947 | 2/1969 | Eygen | 260/837 R |
|---|---|---|---|
| 3,730,948 | 5/1973 | Akiyama | 260/830 P |
| 3,839,493 | 10/1974 | Balme | 260/830 P |
| 3,875,113 | 4/1975 | Lefebvre | 260/830 P |
| 3,880,811 | 4/1975 | Kaupp | 260/830 P |
| 3,883,486 | 5/1975 | Bargain | 260/837 R |
| 3,920,768 | 11/1975 | Kwiatowski | 260/837 R |
| 3,962,182 | 6/1976 | Steele | 260/47 EN |
| 3,978,152 | 8/1976 | Gruffaz | 260/830 P |
| 3,985,928 | 10/1976 | Watanabe | 260/830 P |
| 4,005,154 | 1/1977 | Bargain | 260/837 R |

FOREIGN PATENT DOCUMENTS 50-78,697  6/1975  Japan .................... 260/830 P

*Primary Examiner*—Paul Lieberman
*Attorney, Agent, or Firm*—Joseph F. DiPrima; Vincent J. Cavalieri

[57] ABSTRACT

The invention relates to storage-stable, thermosetting mixtures which contain polymaleimides, alkenylphenols and/or alkenylphenol ethers, epoxide compounds with or without allyl groups, and, optionally, curing accelerators for epoxide resins. These mixtures can be converted by curing into high-polymers which have excellent electrical properties (especially at high temperatures) and very good thermal properties.

17 Claims, No Drawings

EPOXIDE RESIN MIXTURES

Attempts have already been made to improve the electrical properties, the stability to heat and also the chemical inertia at elevated temperatures of conventional epoxide resins by the combination of epoxide resins or epoxide resin mixtures with maleimide derivatives. Reference is made in this respect, for example, to German Auslegeschrift 2,123,638 and to German Offenlegungsschrift 2,230,904. According to the first-mentioned publication, there is claimed a solution of a bisphenol-A epoxide resin and an organic acid anhydride in a maleimide compound, which solution after curing yields the improved materials. German Offenlegungsschrift 2,230,904 claims on the other hand thermosetting compositions comprising the reaction product of an epoxide resin with a prepolymer containing maleimide groups, which prepolymer is formed from a bis-maleimide and an aromatic-aliphatic polyamine; and these compositions are likewise said to yield improved polymers.

The properties of the polymers obtained by the curing of the epoxide resin mixtures according to the stated prior art are however still not sufficiently good for many special applications in the electrical field.

The object of the present invention is to produce mixtures containing epoxide resins and maleimides, which mixtures can be converted by a curing reaction into polymers having electrical properties (particularly at high temperatures) and thermal properties which in both cases are better than those of the known polymers of similar type.

The invention relates to storage-stable, thermosetting mixtures which comprise a) polyimides containing in the molecule at least twice a -radical of the general formula

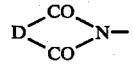     (I)

wherein D represents a bivalent radical containing a carbon-carbon double bond;

b) alkenylphenols and/or alkenylphenol ethers;

c) epoxide compounds containing at least one allyl group and/or epoxide compounds containing no allyl group; and, optionally, d) curing accelerators for epoxide resins.

The mixtures according to the invention contain the constituents preferably in such a ratio that to 1 equivalent of polyimide there are 0.1 to 10, preferably 0.25 to 1.0, mols of alkenylphenol and/or alkenylphenol ether; 0.1 to 10, preferably 0.25 to 3.0, mols of epoxide compound; and, optionally, 0.01 to 5% by weight, relative to the epoxide resin, of a curing accelerator for epoxide resin.

Preferably, the mixtures according to the invention contain as epoxide compound (c) an epoxide compound, or a mixture of several epoxide compounds, from the series:

(α) glycidyl ethers of the formula

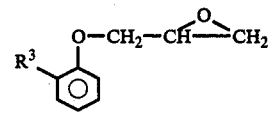     (II)

wherein $R^3$ represents the allyl group or H;

(β) glycidyl ethers of novolaks (X'), which contain one or more allyl groups on aromatic nuclei or contain no allyl groups;

(γ) polyepoxy adducts (Y'), which have been produced by an advancement reaction of one or more diepoxide compounds with one or more bisphenols, whereby some or all of the reactants contain one or more allyl groups on aromatic nuclei, or they contain no allyl groups; and (δ) epoxide compounds (Z') which have been produced by reaction of bisphenols, optionally containing one or more allyl groups on aromatic nuclei, with epichlorohydrin in an alkaline solution.

The glycidyl ethers of novolaks (X') usable in the mixtures according to the invention correspond exactly to those described in the "Handbook of Epoxy Resins" by Henry Lee and Kris Neville (Mc Graw-Hill Book Corp., USA 1967) under 2–10 to 12, except that those according to the invention can contain also one or more allyl groups on the aromatic nuclei. In producing the novolaks, which are glycidylised, the procedure accordingly entails either starting with phenols containing no allyl groups or starting completely or partially with allylphenols.

The epoxide compounds (Z') usable according to the invention correspond generally to the standard epoxide resins from polyphenols and epichlorohydrin, as are discussed in the above-mentioned Handbook under 2—2 (see also Houben-Weyl "Methoden der Organischen Chemie" (Methods in Organic Chemistry), Stuttgart 1963, Volume 14, 2nd part, pp. 468–470), the only distinction being that those according to the invention can also contain, as in the case of the above novolak epoxide resins, one or more allyl groups on aromatic nuclei. In the production of these epoxide compounds (Z'), the following bisphenols can be reacted with epichlorohydrin in alkaline solution:

bisphenol-A,
bisphenol-F,
o,o'-diallyl-bisphenol A, and
o,o'-diallyl-bisphenol F.

Optionally, it is also possible to start with mixtures of these bisphenols. Concerning this type of epoxide compounds in general, a detailed account has been given by H. Batzer and S. A. Zahir in the "Journal of Applied Polymer Science", 19 (1975) 585–600. The production process is designated therein as the "Taffy" process.

In this publication is likewise described the type of polyepoxy adducts (Y') usable according to the invention, which are obtained by means of an advancement reaction (see also M. Lidarik "Kunststoff Rundschau", No. 1, January 1959, pp. 6 to 10). Depending on whether the bisphenols or diepoxide compounds used in the production process contain or do not contain allyl groups, there are obtained either compounds containing allyl groups on aromatic nuclei or products containing no allyl groups.

There are preferably used according to the invention as polyepoxy adducts (Y') such products which have been produced by an advancement reaction of a diglycidyl ether of the formula

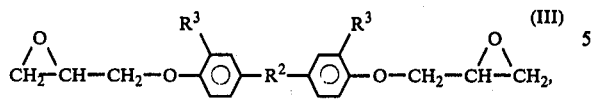

wherein $R^2$ represents one of the radicals —$CH_2$— and

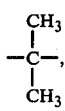

and $R^3$ has the aforegiven meaning,
with one or more of the bisphenols of the formulae

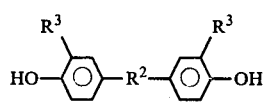

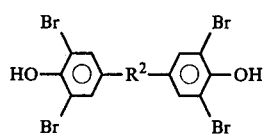

Essentially, also quite different epoxide compounds are usable according to the invention, such as epoxide compounds containing triglycidylisocyanurate or hydantoin nuclei.

Most of the imides usable according to the invention are described in detail in the literature. They can be produced, using the methods described in the U.S. Pat. No. 3,010,290 and in the G.B. Patent Specification No. 1,137,592, by reaction of the corresponding diamines with the unsaturated dicarboxylic acid anhydrides.

The mixtures according to the invention can contain all the polyimides which have been already listed in the French Pat. No. 1,555,564. Particularly well suited are the maleimides containing the radical of the formula I, in which D represents the bivalent radical of the formula

wherein r represents hydrogen or methyl.

A preferred embodiment of the invention comprises mixtures with polyimides containing the radical of the formula (I) two or three times in the molecule, and hence comprises solutions containing in particular bis- and tris-maleimides.

To be mentioned as bis-maleimides which are particularly well suited are compounds of the formula

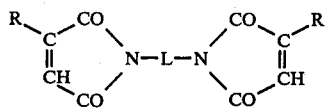

wherein L represents a bivalent organic radical having 2 to 30 C atoms.

The radical L in the formula VII corresponds preferably to the formula

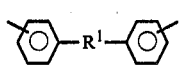

wherein $R^1$ represents one of the radicals —$CH_2$—,

—$SO_2$—, —SO—, —S— and —O—.

The following substances may be mentioned as examples of known polyimides which are suitable for the mixtures according to the invention:
N,N'-hexamethylene-bis-maleimide, N,N'-p-phenylene-bis-maleimide, N,N'-4,4'-diphenylmethane-bis-maleimide, N,N'-4,4'-3,3'-dichlorodiphenylmethane-bis-maleimide, N,N'-4,4'-diphenyl ether-bis-maleimide, N,N'-4,4'-diphenylsulphone-bis-maleimide, the N,N'-bis-maleimide of 4,4'-diamino-triphenyl phosphate, the N,N'-bis-maleimide of 4,4'-diamino-triphenyl thiophosphate, the N,N',N''-tris-maleimide of tris-(4-aminophenyl) phosphate and the N,N',N''-tris-maleimide of tris-(4-aminophenyl) thiophosphate.

Also mixtures of two or more of all the above-mentioned polyimides can be used for the mixtures according to the invention.

As alkenylphenols or alkenylphenol ethers are preferably used according to the invention allylphenols and methallylphenols or the ethers thereof. Both mononuclear and polynuclear, but preferably binuclear, alkenylphenols or alkenylphenol ethers are applicable, wherein preferably at least one nucleus contains both an alkenyl group and a phenolic, optionally etherified OH group.

Alkenylphenols are produced, as is known, by thermal rearrangement (Claisen) of the alkenyl ethers of phenols (e.g. of the allyl ether of phenol). These alkenyl ethers are obtained, likewise using known processes, by the reaction of phenols and, e.g., allyl chloride in the presence of alkali hydroxide and solvents. As is known, there occurs condensation (alkali chloride elimination).

A typical binuclear alkenylphenol usable according to the invention is that of the formula

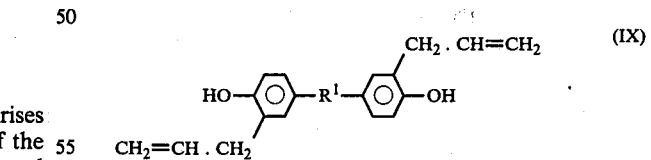

wherein $R^1$ has the above meaning.

Good results are also obtained when the mixtures according to the invention contain mixtures of polynuclear alkenylphenols and/or alkenylphenol ethers with mononuclear alkenylphenols and/or alkenylphenol ethers. As alkenylphenol ethers are preferred such substances which contain, once or repeatedly, the molecule radical of the formula

—O—$R^2$,  (X)

wherein $R^2$ represents an alkyl radical having 1 to 10 C atoms, an aryl radical or an alkenyl radical, preferably allyl or methallyl, and the O atoms in the formula X represents the phenolic ether bridge.

A further embodiment of the invention is constituted by those mixtures according to the invention which contain, as alkenylphenols, mixtures of substances containing only one OH group and only one alkenyl group on the aromatic nucleus with substances containing several OH groups and/or several alkenyl groups on the aromatic nucleus, or which contain the mixtures of the corresponding phenol ethers of these substances.

The following substances are to be listed as examples of alkenylphenols which are usable for the mixtures according to the invention:
o,o'-diallyl-bisphenol-A, 4,4'-hydroxy-3,3'-allyl-diphenyl, bis-(4-hydroxy-3-allyl-phenyl)-methane, 2,2-bis-(4-hydroxy-3,5-diallyl-phenyl)-propane and eugenol.

Likewise are the corresponding methallyl compounds applicable. Instead of the stated alkenylphenols, it is also possible to use the corresponding ethers of these phenols, especially the methyl ethers.

In the realisation of the object of this invention, it had to be surprising that the mixtures according to the invention led to such a high dimensional stability of the polymers at high temperatures. That was of course not to be expected with the high proportion of epoxide compounds. It was likewise surprising that the allyl groups and phenolic hydroxyl groups, which in themselves inhibit polymerisation, did not have an unfavourable effect on the curing and finally on the physical properties of the polymers.

The invention also relates to a process for producing cross-linked polymers containing imide groups by curing of the mixtures according to the invention.

The corresponding reaction is performed preferably in the melt or partly in the melt and partly in the solid phase. It can however also be performed in particular partially in solution. In most cases, however, an addition of solvents is not necessary because the starting mixtures as such are sufficiently fluid at moderate temperatures (e.g. at 120° C.).

If the process is carried out in the melt, temperatures of 100 to 250° C. are particularly well suited. The curing time is 12 to 30 hours. It is obviously dependent on the curing temperature. The following substances are to be mentioned as suitable solvents: chloroform, dioxane, tetrahydrofuran, dimethylformamide, tetramethylurea and N-methylpyrrolidone.

The process according to the invention can be performed in the following manner also in two stages. After mixing and, optionally, after subsequent grinding of all the starting products, the powder or the liquid is firstly heated for a limited time preferably at 120–170° C., in consequence of which a still thermoplastic, partially soluble produce is formed. This prepolymer has, if necessary, to be ground again into the form of a workable powder before it is ultimately cured in final processing. The prepolymerization can also be effected by heating a solution or suspension of the starting materials.

The cross-linked polymers containing imide groups are produced according to the invention as a rule with simultaneous shaping into moulded articles, sheet materials, laminates, bonds or foam plastics. In the process there can be added to the curable compounds the additives customary in the technology of curable plastics, such as fillers, plasticisers, pigments, dyes, mould lubricants or flame-retarding substances. The fillers used can be, for example, glass fibres, mica, graphite, quartz powder, kaolin, colloidal silicon dioxide or metal powders; the internal mould lubricants can be, for example, silicon oil, various waxes, zinc stearate or calcium stearate, etc.

The shaping of the products obtainable by the process according to the invention can be effected in the most simple manner by the casting process using a casting mould.

Shaping can also be performed however by the hot compression moulding process using a press. It is sufficient in most cases to heat briefly at temperatures of 170 to 250° C. at a pressure of 1 to 200 kp/cm$^2$, and to completely cure the resulting moulded article outside the press.

The process according to the invention and the polymers obtainable therefrom are applicable, in particular, in the fields of casting production, surface protection, electrical engineering, lamination processes, adhesives and foam plastics and in the building industry.

PRODUCTION OF STARTING PRODUCTS OF THE PROCESS ACCORDING TO THE INVENTION

I. Production of o,o'-diallyl-bisphenol-A (DABA)

Bisphenol-A (228 g), NaOH (82.5 g) and n-propanol (1 litre) are refluxed. After everything is dissolved, 200 ml of allyl chloride is slowly added. The mixture is practically neutral after three hours, and is refluxed for a further 3 hours. After cooling to room temperature, the precipitated NaCl is filtered off and the n-propanol is distilled off. The resulting crude diallyl ether of bisphenol-A (308 g) is taken up in methylene chloride and washed with water. After separation of the aqueous phase, the methylene chloride is again distilled off. The resulting pure diallyl ether of bisphenol-A is dried over sodium sulphate.

The diallyl ether of bisphenol-A is subjected to a Claisen rearrangement at 200 to 205° C. into o,o'-diallyl-bisphenol-A using the monoether of diethylene glycol as solvent (about 50% solution). The product is afterwards purified by means of a rotary evaporator and subsequently by vacuum distillation (b.p. 190° C./0.5 mm /Hg). The yield of o,o'-diallyl-bisphenol-A is 85%. Both the structure of the intermediate and that of the final product is verified by means of microanalysis, gas chromatography, gel-permeation chromatography and NMR- and IR-spectroscopy.

II. Production of o,o'-diallyl-bisphenol-F (DABF)

The process is performed as described under I except that bisphenol-F is used instead of bisphenol-A.

WORKING EXAMPLES (a) The applied procedure for the production of castings according to the Examples 1 to 10

The amounts, required for the respective test, of polymaleimide, alkenylphenol and/or alkenylphenol ether and an epoxide resin are placed into a round flask. After connection to a rotary evaporator, the temperature is raised to 120 to 150° C. by means of an oil bath. A melt is formed and into this is optionally introduced the specifically required amount of curing accelerator or curing catalyst. The melt is subsequently degassed under vacuum (15 mm Hg); air is then admitted and the melt is poured into moulds preheated to 150° C. The mixture is afterwards heated in an over firstly for 3 hours at 150° C., then for 3 hours at 200° C. and finally for 8 hours at 250° C. Excellent castings are obtained on cooling.

The starting products and the respective amounts used in the individual Examples are given in Table I. The viscosity of the melted starting mixture at 50°, 70° and 100° C. after degassing is also given in some cases.

(b) Mechanical and physical properties of the polymers

The test values of the polymers produced according to (a) are summarised in Table 2. There are in each case three results: namely a test value obtained on the unaged product; a further test value obtained on a specimen heated for 10 hours at 200° C.; and a test value obtained on a specimen heated for 10 hours at 270° C.

The following test methods are applied:

| | |
|---|---|
| dimensional stability under heat: | ISO/R-75* |
| flexural strength and modulus of elasticity | VSM 77 103** |

| | |
|---|---|
| dielectric loss factor tan δ | 80 cm² 50 c.p.s. |
| dielectric constant ε | effective voltage 1000 V C₁ 100 pf |
| specific resistance: | DIN 53 482 |

DIN 53 483

*ISO/R = standards of the International Standard Organisation/Recommendation
**VSM = standards of the "Verein Schweizerischer Maschinenindustrieller" (Association of Swiss Engineering Industrialists)

Loss of weight at 200° C. and at 270°

A specimen of dimensions 60 × 10 × 4 mm is stored for 10 days at 200° C. in a drying cabinet and the loss of weight of the specimen is afterwards determined. An analogous test is performed on a new specimen of the same dimensions after storage at 270° C.

Abbreviations

The following abbreviations are used in the Tables:
MBDM for 4,4'-bismaleimidodiphenylmethane,
DABF for o,o'-diallyl-bisphenol-F, and
DABA for o,o'-diallyl-bisphenol-A.

Table I

| Ex. No. | Employed polyamide Type | Amount g | Amount mol | Employed alkenylphenol (or alkenyl-phenol ether) Type | Amount g | Amount Mol | Employed epoxide compound Type | Amount g | Employed catalyst Type | Amount mg | % by weight | Initial viscosity of the melt after degassing in cP at 50° C | at 70° C | at 100° C |
|---|---|---|---|---|---|---|---|---|---|---|---|---|---|---|
| 1 | BMDM | 214.8 | | DABF | 168 | | bisphenol-A type (5.72 epoxide equivalents/kg) | 262.5 | — | — | | 4734 | 559 | 50.8 |
| 2 | BMDM | 214.8 | | DABF | 168 | | bisphenol-A type (5.72 epoxide equivalents/kg) | 52.5 | — | — | | 29769 | 2240 | 152 |
| 3 | BMDM | 214.8 | | DABF | 168 | | bisphenol-A type (5.72 epoxide equivalents/kg) | 157.5 | — | — | | 10179 | 947 | 102 |
| 4 | BMDM | 214.8 | | DABF | 168 | | bispenol-F type (5.9 epoxide equivalents/kg) | 50.9 | 2-phenyl-imidazole | 0.3 | | 28010 | 2165 | 165 |
| 5 | BMDM | 214.8 | | DABF | 168 | | bisphenol-F type (5.9 epoxide equivalents/kg) | 152.7 | 2-phenyl-imidazole | 0.9 | | 5683 | 794 | 102 |
| 6 | BMDM | 214.8 | | DABF | 168 | | bisphenol-F type (5.9 epoxide equivalents/kg) | 254.1 | 2-phenyl-imidazole | 15.0 | | 3486 | 527 | 50.8 |
| 7 | BMDM | 358 | | DABA | 308 | | bisphenol-A type (5.25 epoxide equivalents/kg) | 190.5 | 2-phenyl-imidazole | 2.5 | | — | — | |
| 8 | BMDM | 358 | | DABA | 308 | | bisphenol-A type (5.25 epoxide equivalents/kg) | 257.0 | 2-phenyl-imidazole | 3.3 | | — | — | — |
| 9 | BMDM | 358 | | DABA | 308 | | bisphenol-A type (5.25 epoxide equivalents/kg) | 96.25 | 2-phenyl-imidazole | 50.0 | | — | — | — |
| 10 | BMDM | 358 | | DABA | 308 | | bisphenol-A type (5.25 epoxide equivalents/kg | 128.2 | 2-phenyl-imidazole | 70.0 | | — | — | — |

Table II

| Example No. | Ageing | Weight loss on ageing % by weight | Dimensional stability under heat ° C | Change in length % | Change in width % | Modulus of elasticity N/mm² | Flexural strength N/mm² | The dielectric loss factor tan δ is 0.01 at | 0.03 at | Dielectric constant ε at 200° C | Specific resistance Ω · 10⁻¹² |
|---|---|---|---|---|---|---|---|---|---|---|---|
| 1 | unaged | — | 171 | — | — | 3135 | 113.0 | 122° C | 146° C | — | — |
| | 10 days 200° C | 0.8 | 197 | 0.13 | 0.43 | 3604 | 97.5 | — | — | — | — |
| | 10 days | 5.49 | 205 | 0.76 | 0.73 | 3542 | 94.1 | 156° C | 200° C | 3.5 | 3.1 |

Table II-continued

| Example No. | Ageing | Weight loss on ageing % by weight | Dimensional stability under heat °C | Change in length % | Change in width % | Modulus of elasticity N/mm² | Flexural strength N/mm² | The dielectric loss factor tan δ is 0.01 at | 0.03 at | Dielectric constant ε at 200° C | Specific resistance Ω · 10⁻¹² |
|---|---|---|---|---|---|---|---|---|---|---|---|
| 2 | unaged | — | >300 | — | — | 3094 | 109.9 | — | — | — | — |
|   | 10 days 200° C | 0.54 | >300 | 0.09 | 0.27 | 3325 | 99.3 | — | — | — | — |
|   | 10 days 270° C | 2.97 | 176 | 0.55 | 1.00 | 3282 | 102.4 | 220° C | 249° C | 3.5 | 35 |
| 3 | unaged | — | 211 | — | — | 3236 | 121.6 | 146° C | 175° C | >4.2 | — |
|   | 10 days 200° C | 0.65 | 249 | 0.66 | 0.43 | 3580 | 104.0 | — | — | — | — |
|   | 10 days 270° C | 4.26 | 259 | 1.14 | 1.22 | 3690 | 91.2 | 187° C | 219° C | 3.5 | 3.1 |
| 4 | unaged | — | >300 | — | — | 3208 | 109.4 | 192.5° C | 211.5° C | 3.4 | 2.3 |
|   | 10 days 200° C | 0.59 | >300 | 0.09 | 0.43 | 3628 | 78.3 | — | — | —104.2 | 130°— |
|   | 10 days 270° C | 2.94 | — | 0.47 | 0.89 | 3652 | 94.5 | 213° C | 249.4° C | 3.4 | 72 |
| 5 | unaged | — | 191 | — | — | 3316 | 120.9 | 151° C | 180° C | 3.9 | 0.12 |
|   | 10 days 200° C | 0.72 | 249 | 0.29 | 0.40 | 3622 | 82.6 | — | — | — | — |
|   | 10 days 270° C | 4.26 | — | 0.67 | 1.16 | 3678 | 103.7 | 184° C | 217° C | 3.4 | 6.12 |
| 6 | unaged | — | 156 | — | — | 3427 | 104.2 | ⁰ C | 154° C | >4.6 | 0.10 |
|   | 10 days 200° C | 0.96 | 197 | 0.12 | 0.43 | 3512 | 114.8 | — | — | — | — |
|   | 10 days 270° C | 5.53 | — | 1.60 | 1.43 | 3518 | 98.7 | 174.5° C | 205° C | 3.9 | 12 |
| 7 | unaged | — | 164 | — | — | — | 129.8 | 122° C | 163° C | 3.9 | 0.16 |
|   | 10 days 200° C | — | — | — | — | — | — | — | — | — | — |
|   | 10 days 270° C | 3.68 | 246 | — | — | — | 119.4 | 194° C | 222° C | 3.5 | 18 |
| 8 | unaged | — | 125 | — | — | — | 129 | 100° C | 134° C | >4.2 | 0.16 |
|   | 10 days 200° C | — | — | — | — | — | — | — | — | — | — |
|   | 10 days 270° C | 4.21 | 224 | — | — | — | 107.1 | 185° C | 209° C | 3.5 | 5.9 |
| 9 | unaged | — | 138 | — | — | — | 137.7 | 118° C | 196° C | 4.0 | 0.65 |
|   | 10 days 200° C | 0.35 | — | — | — | — | — | 194° C | >230° C | 3.4 | 34 |
|   | 10 days 270° C | 3.36 | 268 | — | — | — | 139.3 | — | — | — | 34 |
| 10 | unaged | — | 135 | — | — | — | 118.7 | 96° C | 180° C | 4.2 | 0.0015 |
|   | 10 days 200° C | 0.4 | — | — | — | — | — | 189° C | 220° C | 3.4 | 0.301 |
|   | 10 days 270° C | 3.44 | 261 | — | — | — | 117.7 | — | — | — | — |

What is claimed is:

1. A storage-stable, thermosetting mixture which comprises:
   (a) a polyimide containing in the molecule at least two radicals of the general formula

wherein D represents a bivalent radical containing a carbon-carbon double bond;
   (b) 0.1 to 10 moles of an akenylphenol, an alkenylphenol ether or mixtures thereof per equivalent of said polyimide;
   (c) 0.1 to 10 moles per equivalent of said polyimides of an epoxide compound of a mixture of several epoxide compounds selected from the group consisting of:
   (α) glycidyl ethers of the formula

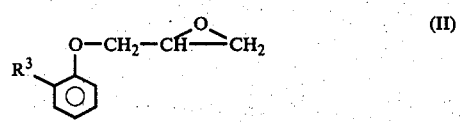

wherein $R_3$ represents an allyl group or H atom, (β) glycidyl ethers of novolaks (X') which contain two or more epoxy groups of said glycidyl ethers additionally substituted on the aromatic nuclei with one or more allyl groups,
   (α) polyepoxy adducts (Y'), having two or more epoxy groups per molecule, produced by an advancement reaction of one or more diepoxide compounds with one or more bisphenols or said diepoxide compounds or bisphenols additionally substituted on the aromatic nuclei with one or more allyl groups,
   (δ) epoxide compounds (Z') produced by the reaction of one or more phenols or said phenols, additionally substituted on the aromatic nuclei with one or more allyl groups, with epichlorohydrin in an alkaline solution, and
   (d) up to 5 percent by weight, relative to the epoxide resin, of a curing accelerator for epoxide resins.

2. A mixture according to claim 1, which contain as polyepoxy adducts (Y') such products which have been produced by an advancement reaction of a diglycidyl ether of the formula

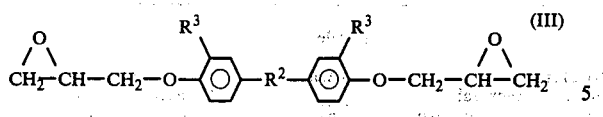 (III)

wherein R² represents one of the radicals —CH₂—
and

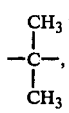

and R³ has the aforegiven meaning,
with one or more of the bisphenols of the formulae

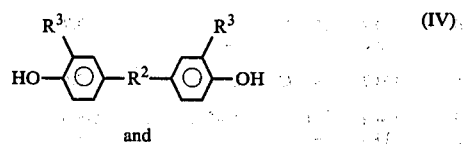 (IV)

and

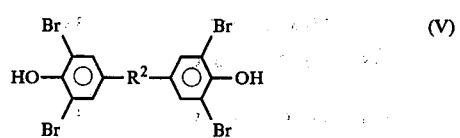 (V)

3. A mixture according to claim 1, which contain polyimides having radicals of the formula (I) in which D represents a bivalent radical of the formula

 (VI)

wherein R represents hydrogen or methyl.

4. A mixture according to claim 1, which contain polyimides having the radical of the formula (I) two or three times in the molecule.

5. A mixture according to claim 3, which contain as polyimide a compound of the general formula

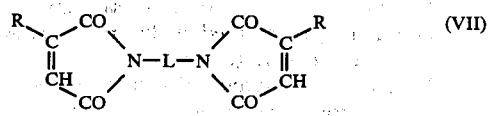 (VII)

wherein L represents a bivalent organic radical having 2 to 30 C atoms.

6. A mixture according to claim 5, which contain as polyimide a compound of the formula (VII) wherein L represents a radical of the formula

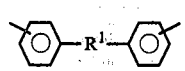 (VIII)

in which R¹ represents one of the radicals —CH₂—,

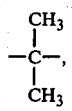

—SO₂—, —SO—, —S— and —O—.

7. A mixture according to claim 6, which contain as polyimide 4,4′-bis-maleimidodiphenylmethane.

8. A mixture according to claim 1, which additionally contain monoimides containing the radical of the formula I, preferably monomaleimides.

9. A mixture according to claim 1, which contain as alkenylphenol or alkenylphenol ether an allylphenol or a methallylphenol or an ether thereof.

10. A mixture according to claim 1, which contain as alkenylphenol phenol or alkenylphenol ether a mononuclear compound.

11. A mixture according to claim 10, which contain as alkenylphenol or alkenylphenol ether eugenol or eugenol methyl ether.

12. A mixture according to claim 1, which contain as alkenylphenol or alkenylphenol ether a mononuclear, preferably binuclear, compound containing at least on one nucleus both an alkenyl group and a phenolic, optionally etherified, OH group.

13. A mixture according to claim 12, which contain as alkenylphenol a bivalent compound of the formula V

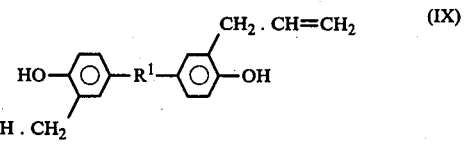 (IX)

wherein R¹ has the above meaning.

14. A mixture according to claim 13, which contain as alkenylphenol o,o′-diallylbisphenol-A.

15. A mixture according to claim 1, which additionally contain phenols and/or phenol ethers having no alkenyl groups.

16. A mixture according to claim 1, which contain as curing accelerator for epoxide resin mixtures 2-phenylimidazole.

17. Process for producing cross-linked polymers containing imide groups, which process comprises bringing to reaction and 9 curing mixture according to claim 1 at temperatures of 50 to 250° C., preferably at 100° to 250° C., whereby an initial part of the reaction can be performed in solution.

* * * * *